(12) United States Patent
Fushimi

(10) Patent No.: US 6,967,558 B2
(45) Date of Patent: Nov. 22, 2005

(54) INVERTER TRANSFORMER AND INVERTER CIRCUIT

(75) Inventor: Tadayuki Fushimi, Tokyo (JP)

(73) Assignee: Sumida Corporation, Tokyo (JP)

(*) Notice: Subject to any disclaimer, the term of this patent is extended or adjusted under 35 U.S.C. 154(b) by 0 days.

(21) Appl. No.: 10/412,417

(22) Filed: Apr. 14, 2003

(65) Prior Publication Data
US 2004/0113565 A1    Jun. 17, 2004

(30) Foreign Application Priority Data
Apr. 15, 2002 (JP) .............................. 2002-112041

(51) Int. Cl.$^7$ .......................................... H01F 27/30
(52) U.S. Cl. ...................... 336/208; 336/198; 336/192
(58) Field of Search .................. 336/225; 363/19, 363/21.16

(56) References Cited

U.S. PATENT DOCUMENTS

| | | | | |
|---|---|---|---|---|
| 4,229,786 A | * | 10/1980 | Mitani et al. | ............. 363/126 |
| 4,335,423 A | * | 6/1982 | Koizumi et al. | ......... 363/21.16 |
| 5,225,971 A | * | 7/1993 | Spreen | ..................... 363/17 |
| 5,315,280 A | * | 5/1994 | Stokes et al. | .............. 336/192 |
| 5,359,313 A | * | 10/1994 | Watanabe et al. | ........... 336/178 |
| 5,642,268 A | | 6/1997 | Pratt et al. | |
| 5,729,774 A | | 3/1998 | Constable | |
| 6,151,225 A | | 11/2000 | Ho et al. | |
| 6,256,179 B1 | | 7/2001 | Yamada et al. | |

FOREIGN PATENT DOCUMENTS

| | | |
|---|---|---|
| JP | 09-035885 | 2/1997 |
| JP | 2001-028831 | 1/2001 |

OTHER PUBLICATIONS

Patent Abstracts of Japan JP 2001-028831.
Patent Abstract of Japan JP 09-035885.

* cited by examiner

Primary Examiner—Anh Mai
(74) Attorney, Agent, or Firm—Finnegan, Henderson, Farabow, Garrett & Dunner, L.L.P.

(57) ABSTRACT

A system for safeguarding the circuit and the step-up transformer can be devised without using the special high-cost components. Voltage supplied by the primary coil (21) of a step-up transformer (2) is switched by a transistor (TR) and the secondary coil (22) of the step-up transformer causes the generation of secondary voltage. To detect the voltage generated by the secondary coil of the step-up transformer, a voltage detection coil wrapped around the step-up transformer (2) is provided. Abnormalities in the voltage supplied to a cold cathode tube (1) are detected based on voltage detected by this voltage detection coil (23). Switching by the transistor (TR) is stopped when an abnormality is detected.

4 Claims, 5 Drawing Sheets und INVERTER TRANSFORMER AND
INVERTER CIRCUIT

BACKGROUND OF THE INVENTION

1. Technical Field of the Invention

The present invention concerns an inverter transformer and an inverter circuit used in a cold cathode tube light for an LCD (liquid crystal display) backlight, etc.

2. Related Technology

Conventionally, cold cathode tubes are employed in LCD backlights. With the aim of devising more efficient and smaller-sized lighting, a separate excitation drive circuit employing an IC is used. This separate excitation drive circuit uses, for example, the resonance image of the floating capacity resulting from the cold cathode tube, which serves as a charge, and the device in which it is mounted, and the leak inductance of a driving step-up transformer (inverter transformer). This resonance image generates high voltage. Illumination occurs by applying this high voltage to the aforementioned cold cathode tube.

When the cold cathode tube in the aforementioned circuit is damaged or when there is no contact between the cold cathode tube and the step-up transformer, extremely high voltage is output continuously from the step-up transformer. This has caused such problems as step-up transformer breakage, driving circuit breakage, and so on.

The type of circuit structure depicted in FIG. 8, for example, is used to resolve the aforementioned problems. Provided on the secondary side of the step-up transformer (100) are two in-line condensers (C1), (C2). Voltage divided by these condensers (C1), (C2) is supplied to IC (120) and abnormalities are detected. If an abnormality is detected, circuit protection has been devised in that the switch signal supplied by the IC (120) to the transistor TR base is interrupted.

However, in a circuit structured in the manner described above, the condensers (C1), (C2) serving as circuits to detect abnormalities are directly connected to the step-up transformer (100), a high-voltage output component. Consequently, because the aforementioned condensers (C1), (C2) are small capacity, a special high-voltage resistant condenser that can resist high voltage is required (several pF high-voltage ceramic condenser). This is one aspect that contributes to increasing the cost of the apparatus.

Furthermore, when abnormalities such as breakage of the step-up transformer (100) and cold cathode tube (110), etc. occur, the circuit components that safeguard the drive circuit and the step-up circuit (100) comprising the IC (120) and the transistor (TR) are concentrated on the output side of the step-up transformer (100). Since the output side of the step-up transformer (100) outputs several hundred to several thousand volts of high voltage, the components must be physically separated, thus causing the problem of increasing the circuit mounting surface area.

The present invention was created to resolve these sorts of problems found in conventional inverter circuits. Thus, an objective of the invention is to provide an inverter circuit that does not require special high-cost components and whereby protection appropriate to the circuit and the rising-voltage transformer can be devised. In the present invention, moreover, an objective is to provide an inverter circuit without a large mounting surface area in that there is no need to place components on the high output side of the step-up transformer. A further objective of the present invention is to provide an inverter transformer to use in the aforementioned inverter circuit.

SUMMARY OF THE INVENTION

The inverter transformer related to the present invention is characterized in that in an inverter transformer wherein a primary coil and a secondary coil are wound around a bobbin, a voltage detection coil to detect voltage output by the aforementioned second coil is coiled around the aforementioned winding rod so as to be magnetically coupled to the aforementioned primary coil and positioned so as to adjoin the aforementioned secondary coil.

The inverter circuit related to the present invention is further characterized in that a tap is provided in the aforementioned second coil, and part of the aforementioned second coil serves as the aforementioned voltage detection coil.

The inverter circuit of the present invention is such that in an inverter circuit structured so that voltage supplied by the transformer's primary coil is switched by a switching element, secondary voltage is generated by the aforementioned transformer's secondary coil and, along with the supply of said secondary voltage to the cold cathode tube, current flowing through the aforementioned cold cathode tube is detected and the switching functions of the aforementioned switching element are controlled based on these detection results, there are provided a voltage detection coil wrapped around the aforementioned transformer to detect voltage generated by the aforementioned transformer's secondary coil, an abnormality detection means to detect abnormalities in the voltage supplied to the aforementioned cold cathode tube based on the voltage detected by the aforementioned voltage detection coil, and a stopping means to stop the aforementioned switching when the aforementioned abnormality detection means detects an abnormality.

The inverter circuit related to the present invention is further characterized in that the aforementioned voltage detection coil is wound about the aforementioned transformer so as to adjoin the aforementioned secondary coil.

The inverter circuit related to the present invention is further characterized in that a tap is provided in the aforementioned secondary coil, and part of the aforementioned secondary coil serves as the aforementioned voltage detection circuit.

A BRIEF DESCRIPTION OF THE FIGURES

In the figures, identical components bear the same code number, and duplicate explanations of such components are omitted.

A DETAILED EXPLANATION OF THE INVENTION

Figure 1:
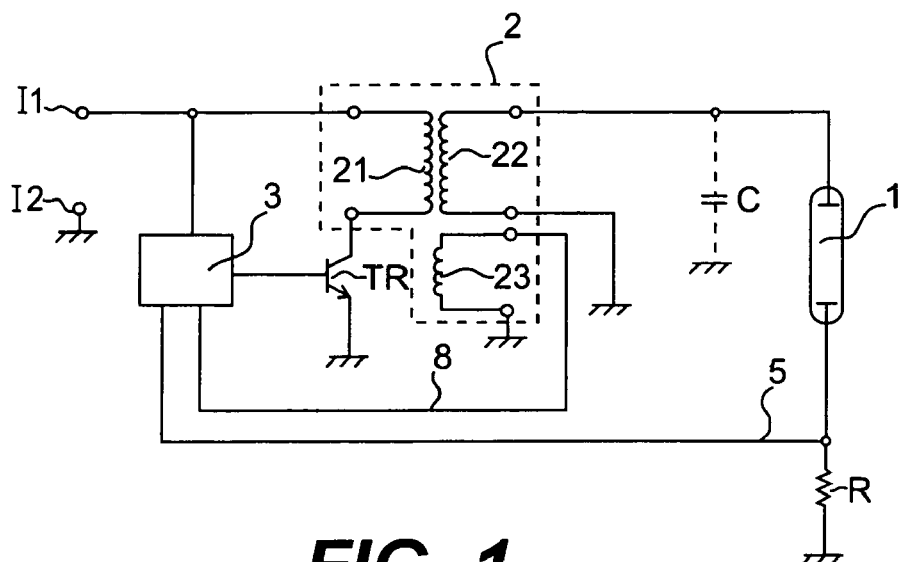
FIG. 1 is a structural diagram depicting a first embodiment of an inverter circuit related to the present invention.

Embodiments of an inverter circuit related to the present invention will be explained with reference to the appended figures. FIG. 1 depicts an example of the structure of an illumination device using an inverter circuit relating to a first embodiment. The cold cathode tube (1) is charge in this illumination device, and a step-up transformer (2), a transistor (TR), and an IC (3) for driving are used.

In this inverter circuit, direct current is applied to input terminals (11)–(12) and the voltage applied to the primary coil (21) of the step-up transformer (2) is switched by transistor (TR), which is a switching element. Secondary voltage is generated by the secondary coil (22) of the step-up transformer (2) and said secondary voltage is applied to the cold cathode tube (1). At the same time, current flowing through the cold cathode tube (1) is detected by the IC (3) by way of the signal line (5). The switching operations of transistor (TR), which is a switching element, are controlled based on these detection results, and secondary side voltage in the step-up transformer is fluctuated.

Moreover, the status of the space between the ungrounded side line and the ground in the secondary coil (22) of the step-up transformer (2) is such that the floating capacity (C) generated between the ground and the casing, etc. of the cold cathode tube (1) are connected. Furthermore, the cold cathode tube (1) is grounded by way of load resistance (R).

Figure 2:
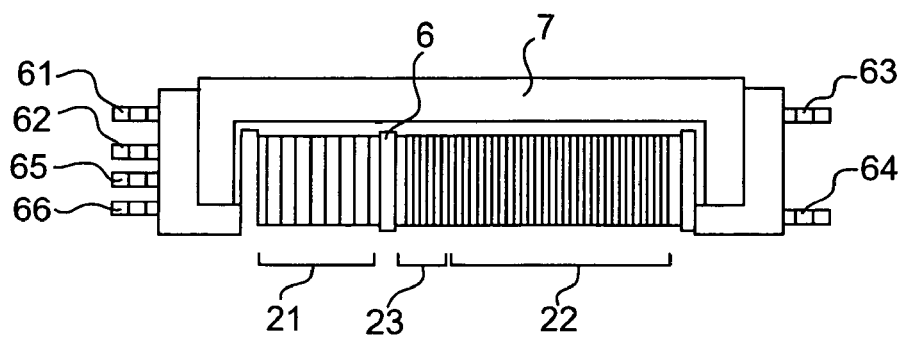
FIG. 2 is a top-down diagram of a step-up transformer used in the inverter circuit related to the present invention.

In the present embodiment, the voltage detection coil (23) is coiled around the step-up transformer (2) to detect voltage generated by the secondary coil (22) of the step-up transformer (2). Specifically, as depicted in FIG. 2, on the left side of a bobbin (6) that serves as a winding rod and consists of plastic or such is wound the primary coil (21); the secondary coil (22) is wound around the right side, and the voltage detection coil (23) is coiled so as to adjoin this secondary coil (22).

In this case, for example, when the number of turns in the primary coil (21) is 40 and the number of turns in the secondary coil (22) is 2,000, the number of turns in the voltage detection coil (23) is 10. The output voltage of the secondary coil (22) when the input voltage of the primary coil (21) is 12V is then usually 600V (during illumination), and the voltage detection coil (23) yields a detection voltage of 3V. Moreover, when the abnormal time threshold value (a threshold value V2 explained subsequently) is 10V, the output voltage of the secondary coil (22) is 2,000V at an abnormal time. In this way, the inverter transformer of the present invention adopts a structure whereby a voltage detection coil (23) with an extremely small number of turns compared to the number of turns in the secondary coil is wrapped around the high voltage side and adjoins the secondary coil (22). In doing so, the desired voltage detection is possible in an appropriate manner, even with a small step-up transformer (inverter transformer) (2). A structure whereby circuit protection is devised can be realized in a manner discussed subsequently.

Figure 3:
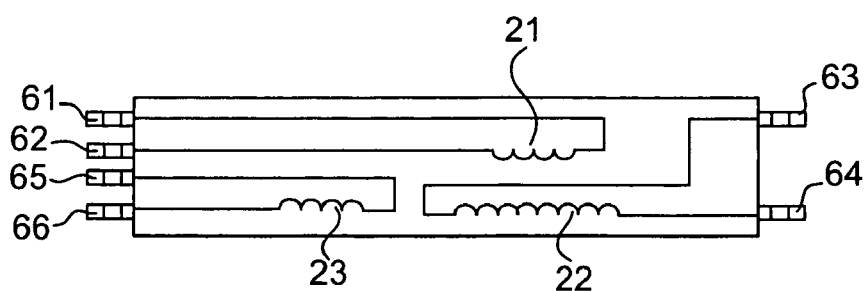
FIG. 3 is a diagram depicting the connection relationship of the terminals and coils in the step-up transformer used in the first embodiment of the inverter circuit related to the present invention.

Wrapped inside the bobbin (6) is an I-core not depicted in the figure. The two ends of the bobbin (6) are connected to ends of the U-shaped core (7). The aforementioned I-core and the aforementioned core (7) form a magnetic path. As is clear from FIG. 3, which depicts the connection relationships of the various terminals and coils, the primary coil (21) is connected to terminals (61) and (62), the secondary coil (22) is connected to the terminals (63) and (64), and the voltage detection coil (23) is connected to the terminals (65) and (66).

Figure 4:
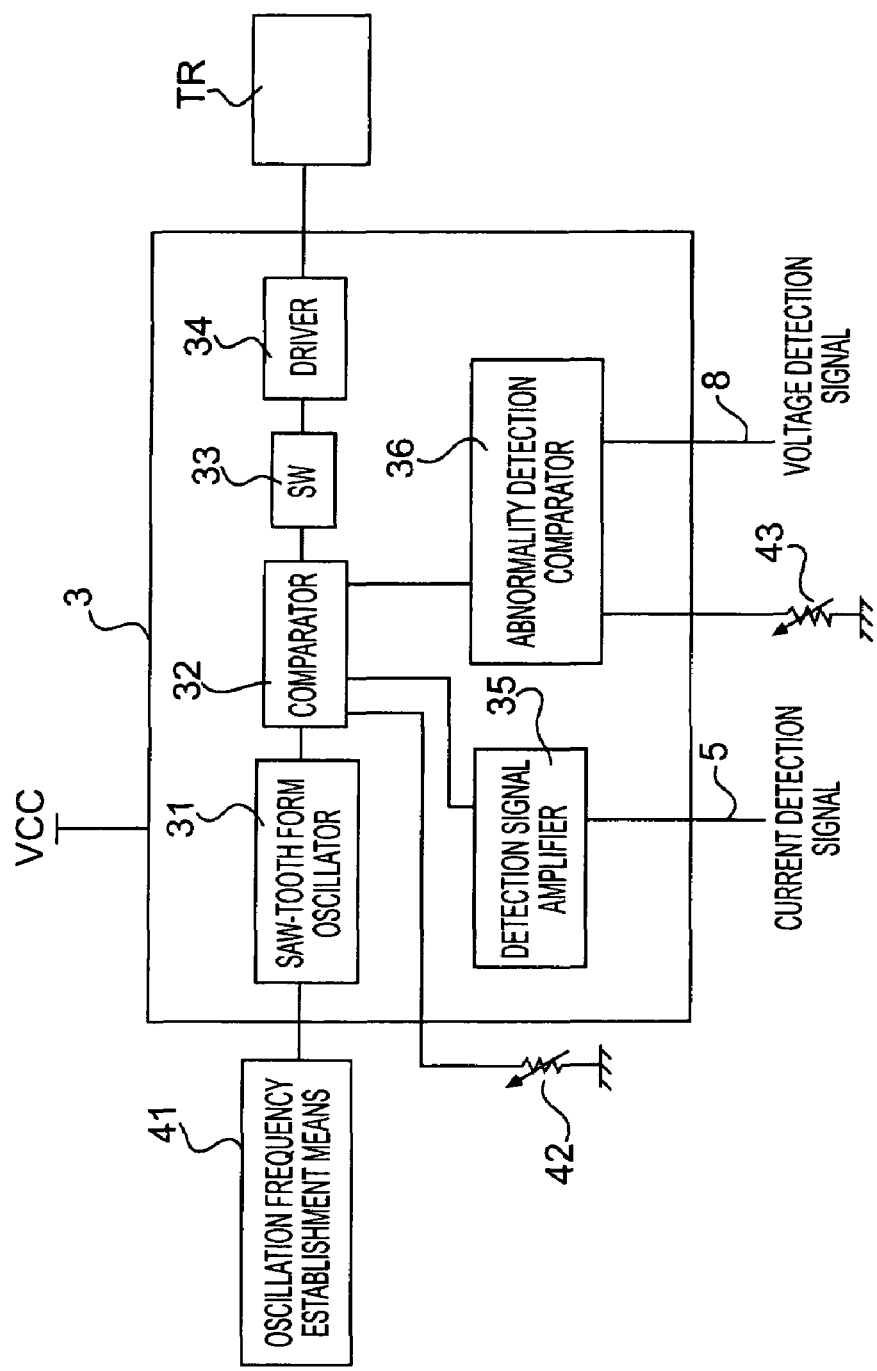
FIG. 4 is a diagram depicting the internal structure of an IC used in an inverter circuit related to the present invention.

Voltage detected by the voltage detection coil (23) is forwarded to the IC (3) through line (8). FIG. 4 depicts the internal structure of the IC (3). A saw-tooth wave oscillator (31) is provided in IC (3). Saw-tooth waves of a prescribed frequency set by the oscillation frequency-setting device (41) are output from the aforementioned saw-tooth wave oscillator to the comparator (32).

Figure 5:
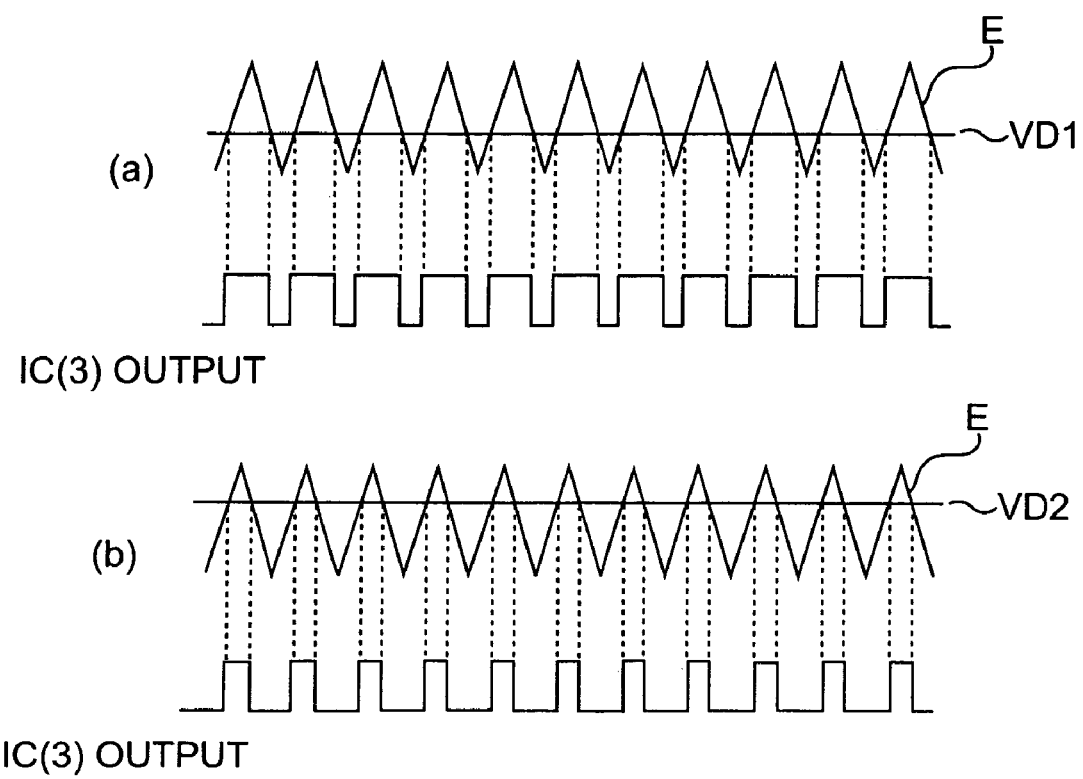
FIG. 5 is a figure to explain the operations of the IC used in the inverter circuit related to the present invention.

The comparator (32) receives output signals from the saw-tooth wave oscillator (31) as well as the threshold value set by the variable resistance (42) and the output of the detection signal amplifier (35). The comparator (32) creates the differential signal (Vd) of the signal amplified by the aforementioned detection signal amplifier and the threshold value set by the variable resistance. The comparator (32) compares the aforementioned differential signal (Vd) to the saw-tooth wave signal (E) output from saw-tooth wave oscillator (31) and then emits a pulse. As depicted in FIG. 5(a), this pulse has a pulse band that corresponds to a range in which the potential of the saw-tooth wave signal (E) exceeds the potential of the differential signal (Vd).

The pulse band of the output pulse changes as depicted in FIG. 5(b) in line with changes in the differential signal (Vd). This pulse passes through the switch (33) that is usually in open state, reaches the driver (34), and is converted to a signal that drives the transistor (TR), which is a switching element. At the IC (3), a signal to drive the transistor (TR) is created and output from the aforementioned pulse such that a prescribed current flows to the cold cathode tube (1).

Furthermore, the IC (3) is outfitted with an abnormality detection comparator (36). When the abnormality detection comparator (36) compares a voltage detection signal corresponding to the voltage generated by the secondary coil (22) of the step-up transformer (2), and obtained by way of line (8), to the threshold voltage set by the variable resistance (43), and then a voltage detection signal that exceeds the threshold voltage is detected as an abnormality, the switch (33) closes.

In an inverter circuit that has the aforementioned structure, when an energy source is applied to the cold cathode tube (1) and illumination occurs, the comparator (32) establishes a differential signal (Vd1) to cause high voltage to be output when operations start. At that time, no current is flowing through the cold cathode tube (1), and so the current detection signal is zero. Pulse with a large pulse band is output from the saw-tooth wave oscillator (31), and the secondary coil (22) generates the high voltage required when operations start.

Moreover, the variable resistance (43) is established, as is the threshold voltage (V2) that corresponds to the high voltage generated by the secondary coil (22) when operations start. Hence, even when the high voltage that is required when operations start is generated by the secondary coil (22), the cold cathode tube (1) starts to operate appropriately without a switch (33) being closed by an abnormality detection comparator (36). Furthermore, when an abnormally high voltage is generated that is higher than the high voltage originally generated by the secondary coil (22), and a voltage higher than the aforementioned set threshold voltage (V2) arrives at the abnormal detection comparator (36) by way of the line (8), the abnormality detection comparator (36) closes the switch (33), and breakage of step-up transformer (2) and so on caused by the intermittent generation of abnormally high voltage is stopped.

When the aforementioned starting operations occur in an appropriate manner and the cold cathode tube (1) illuminates, current flows through the cold cathode tube (1) and a current detection signal appears in the signal line (5). This signal is then amplified by the detection signal amplifier (35). The comparator (32) compares the amplified current detection signal to a threshold value (V1) set by the variable resistance (42), resulting in incremental signal (Vd2). This increment signal (Vd2) is a value that corresponds to the voltage that is to be generated by the secondary coil (22) when the cold cathode tube (1) illuminates and has a higher potential than the previously set increment signal (Vd1). Thereafter, the pulse that performs pulse band control in correspondence with the differential between the threshold voltage (V1) and the current detection signal is output from the saw-tooth form wave oscillator (33), whereby the voltage required during illumination is generated by the secondary coil (22).

It is thought that a cold cathode tube (1) illuminates when a current detection signal appears in signal line (5), or after a prescribed time has elapsed from the time a current detection signal has appeared (a margin added to the time elapsed from the ordinary starting of operations until the cold cathode tube illuminates). At that time, when a voltage higher than the aforementioned set threshold voltage (V2) arrives at the abnormality detection comparator (36) by way of the line (8), the abnormality detection comparator (36) is such that the switch (33) closes and breakage of the step-up transformer (2) and such by the generation of abnormally high voltage stops. Thus, when cold cathode tube (1) illumination occurs, cold cathode tube (1) illumination will occur intermittently as appropriate without the switch (33) being closed by the abnormality detection comparator, provided no voltage higher than the threshold voltage (V2) is detected.

For example, suppose that when the cold cathode tube (1) begins to operate the secondary coil (22) generates 1500V and, under ordinary illumination, the secondary coil (22) generates 600V. If that is the case, the threshold value V2 adopted is the voltage that the detection coil (23) generates to handle the abnormal voltage 2,000V generated by the secondary coil (22). Thus, in an abnormal status in which the secondary coil (22) generates a voltage above 2000V when the cold cathode tube (1) starts to operate or when lighting occurs, a voltage above the threshold voltage V2 arrives at the abnormality detection comparator (36) by way of the line (8). The abnormality detection comparator (36) closes the switch (33), thereby preventing the breakage of the step-up transformer by the generation of abnormally high voltage. Such abnormal situations occur when the cold cathode tube (1) breaks, comes out of place, etc. In the manner discussed above, the voltage detection coil (23) is wound so as to adjoin the secondary coil (22) of the step-up transformer (2), voltage generated by the secondary coil (22) is detected, and abnormalities can be discovered appropriately. Thus, the structure of the high voltage side of the step-up transformer can be simplified. Moreover, breakage of the step-up transformer and such can be prevented without using special high-cost components.

Figure 6:
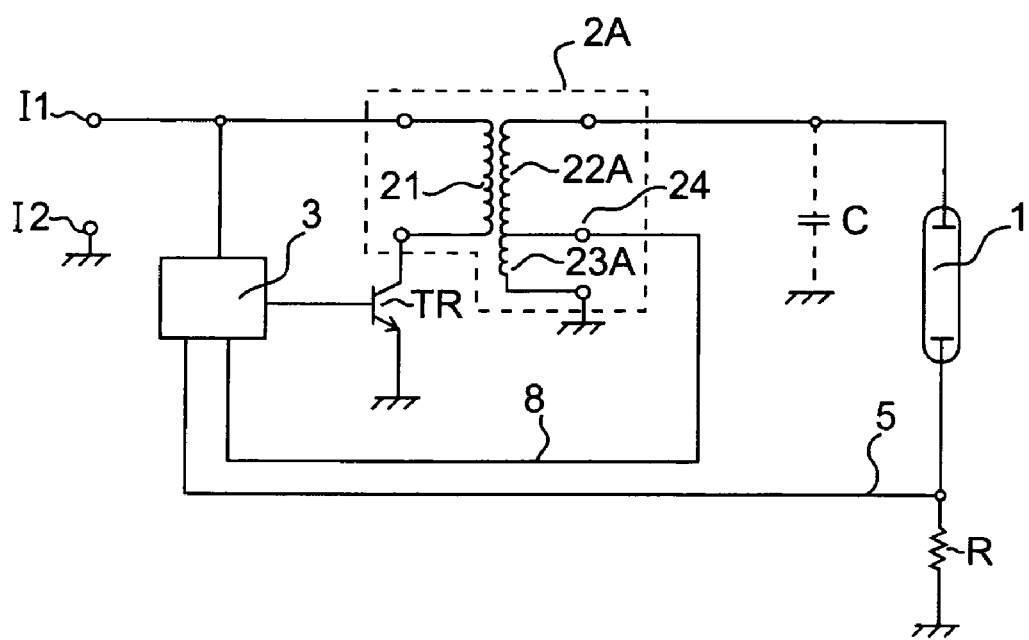
FIG. 6 is a structural diagram depicting a second embodiment of an inverter circuit related to the present invention.

Following is an explanation of a second embodiment. As depicted in FIG. 6, a tap (24) is provided in the secondary coil (22A) of the step-up transformer (2A) in the inverter transformer related to the present embodiment, and a minor portion of the number of coils can serve as the voltage detection coil (23A).

Figure 7:
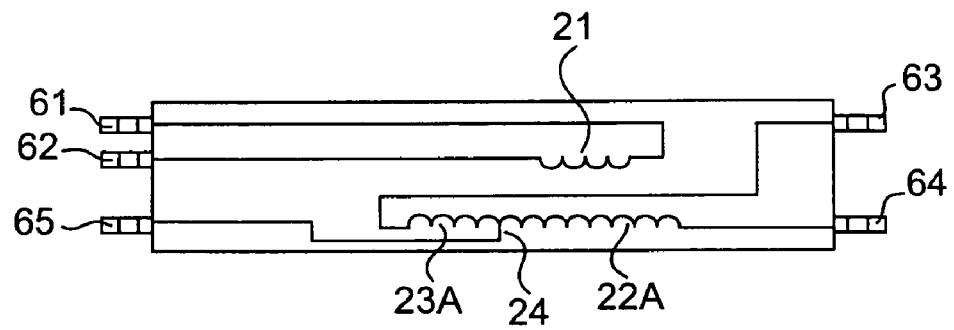
FIG. 7 is a diagram depicting the connection relationship of the terminals and coils in the step-up transformer used in the second embodiment of the inverter circuit related to the present invention.
Figure 8:
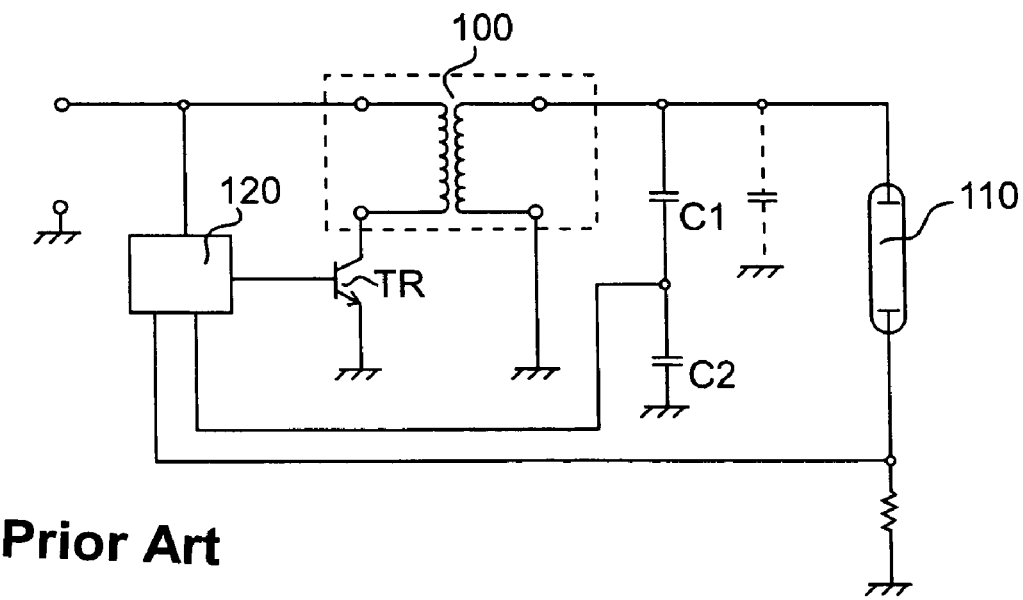
FIG. 8 is a structural diagram depicting an inverter circuit related to a conventional example.

As is clear in the FIG. 7 depiction of the connection relationships between the terminals and coils, the primary coil (21) is connected to terminals (61) and (62), the secondary terminal (22A) is connected to the terminals (63) and (64), and the tap (24) of the voltage detection coil (23A) is connected to terminal (65).

In the inverter circuit, the aforementioned external structure is the same as the structure of the first embodiment. A voltage detection coil (23A) is used in the second embodiment as well. Voltage generated by the secondary coil (22A) is detected, and abnormalities can be discovered appropriately. Also with the second embodiment, the structure of the high voltage side of the step-up transformer (2) can be simplified and, moreover, breakage of the step-up transformer (2) and such can be stopped without using special high-cost components. Furthermore, the structure is such that a tap is provided in the secondary coil (22A) of the step-up transformer (2) and voltage detection occurs. Compared to the first embodiment, then, a mere single terminal can be used whereby a small-sized apparatus can be devised.

What is claimed is:

1. An inverter transformer, comprising:
    a primary coil and a secondary coil coiled around a bobbin; and
    a voltage detection coil to detect voltage output by the secondary coil, wherein the voltage detection coil is coiled around the bobbin so as to be magnetically coupled to the primary coil and to adjoin the secondary coil,
    wherein:
    the primary coil is coiled around the bobbin in a first area, and the secondary coil is coiled around the bobbin in a second area different from the first area;
    terminals linked to lines connected to the primary coil are provided in a different side in the bobbin from terminals linked to lines connected to the secondary coil; and
    terminals linked to lines connected to the voltage detection coil are provided on the same side of the bobbin as the terminals linked to the primary coil.

2. An inverter transformer, comprising:
    a primary coil and a secondary coil coiled around a bobbin;
    a voltage detection coil to detect voltage output by the secondary coil, wherein the voltage detection coil is coiled around the bobbin so as to be magnetically coupled to the primary coil and to adjoin the secondary coil; and
    a tap provided in the secondary coil such that at least part of the secondary coil serves as the voltage detection coil;
    wherein:
    one end of the secondary coil is grounded and the other end of the secondary coil is un-grounding:
    there are fewer turns between the tap and the one end than between the tap and the other end, and
    the tap is provided in a plurality of coil positions corresponding to a threshold value for detecting the abnormal voltage generated in the secondary coil.

3. The inverter transformer according to claim 2, further comprising:
    first terminals linked to lines connected to the secondary coil;
    second terminals linked to lines connected to the primary coil in a different side of the bobbin from the first terminals; and
    a third terminal linked to the tap and positioned on the same side of the bobbin as the second terminals.

4. An inverter transformer, comprising:

a bobbin;

a primary coil and secondary coil coiled around the bobbin, wherein the primary coil is coiled around the bobbin in a first area, and the secondary coil is coiled around the bobbin in a second area different from the first area;

a voltage detection coil to detect voltage output by the secondary coil, wherein the voltage detection coil is coiled around the bobbin so as to be magnetically coupled to the primary coil and to adjoin the secondary coil;

a first terminal linked to a line connected to the primary coil;

a second terminal linked to a line connected to the secondary coil; and a third terminal linked to a line connected to the voltage detection coil, wherein the first terminal is positioned on a different side of the bobbin from the second terminal, and the third terminal is positioned on the same side of the bobbin as the first terminal.

* * * * *